United States Patent
Kondo (10) Patent No.: US 10,484,661 B2
(45) Date of Patent: Nov. 19, 2019

(54) THREE-DIMENSIONAL IMAGE GENERATING DEVICE, THREE-DIMENSIONAL IMAGE GENERATING METHOD, PROGRAM, AND INFORMATION STORAGE MEDIUM

(71) Applicant: Sony Computer Entertainment Inc., Tokyo (JP)

(72) Inventor: Satoshi Kondo, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 254 days.

(21) Appl. No.: 14/905,373

(22) PCT Filed: Mar. 19, 2014

(86) PCT No.: PCT/JP2014/057483
§ 371 (c)(1),
(2) Date: Jan. 15, 2016

(87) PCT Pub. No.: WO2015/019656
PCT Pub. Date: Feb. 12, 2015

(65) Prior Publication Data
US 2016/0156897 A1    Jun. 2, 2016

(30) Foreign Application Priority Data

Aug. 6, 2013    (JP) ................................ 2013-163037

(51) Int. Cl.
*H04N 13/128*    (2018.01)
*H04N 13/167*    (2018.01)
(Continued)

(52) U.S. Cl.
CPC ........... *H04N 13/128* (2018.05); *G09G 3/003* (2013.01); *H04N 13/167* (2018.05); *H04N 13/344* (2018.05); *G09G 2370/04* (2013.01)

(58) Field of Classification Search
CPC ............ H04N 13/0022; H04N 13/044; H04N 13/0051; G09G 3/003
See application file for complete search history.

(56) References Cited

U.S. PATENT DOCUMENTS

| | | | | |
|---|---|---|---|---|
| 6,031,538 A | * | 2/2000 | Chupeau | G06T 13/80 345/419 |
| 6,518,939 B1 | * | 2/2003 | Kikuchi | G06F 3/147 345/8 |

(Continued)

FOREIGN PATENT DOCUMENTS

| | | |
|---|---|---|
| CN | 1864415 A | 11/2006 |
| CN | 102308590 A | 1/2012 |

(Continued)

OTHER PUBLICATIONS

Office Action for corresponding CN Application No. 2014800429373, 15 pages, dated Sep. 5, 2016.

(Continued)

*Primary Examiner* — Neil R Mikeska
(74) *Attorney, Agent, or Firm* — Matthew B. Dernier, Esq.

(57) ABSTRACT

A three-dimensional image generating device, a three-dimensional image generating method, a program, and an information storage medium provide for the ability to set the amount of disparity of a generated three-dimensional image to the amount of disparity according to the kind of display on which this three-dimensional image is displayed. A set value identifying section identifies the kind of display to which a three-dimensional image is output. An image generating section generates the three-dimensional image with the amount of disparity according to the kind of the display identified.

9 Claims, 4 Drawing Sheets

(51) Int. Cl.
*H04N 13/344* (2018.01)
*G09G 3/00* (2006.01)

(56) References Cited

U.S. PATENT DOCUMENTS

| | | | |
|---|---|---|---|
| 8,035,683 B2 | 10/2011 | Kitaura | |
| 8,120,606 B2 | 2/2012 | Nakamura | |
| 8,301,013 B2* | 10/2012 | Yamashita | H04N 13/0029 348/51 |
| 8,330,796 B2* | 12/2012 | Schmidt | H04N 13/0025 348/36 |
| 8,605,994 B2* | 12/2013 | Ogata | H04N 13/0022 382/154 |
| 9,143,764 B2 | 9/2015 | Izawa | |
| 9,191,658 B2 | 11/2015 | Kato | |
| 2004/0208357 A1* | 10/2004 | Tokuhashi | G06K 9/209 382/154 |
| 2006/0192776 A1* | 8/2006 | Nomura | H04N 13/0022 345/419 |
| 2006/0232498 A1* | 10/2006 | Seo | G02B 26/0833 345/6 |
| 2006/0290778 A1 | 12/2006 | Kitaura | |
| 2010/0001926 A1* | 1/2010 | Amirparviz | A61B 5/1455 345/7 |
| 2010/0039504 A1* | 2/2010 | Takahashi | G02B 27/0025 348/54 |
| 2011/0032338 A1 | 2/2011 | Raveendran | |
| 2011/0109720 A1 | 5/2011 | Smolic | |
| 2011/0292045 A1* | 12/2011 | Nakamura | G03B 35/08 345/419 |
| 2011/0304710 A1* | 12/2011 | Ito | H04N 13/0011 348/51 |
| 2012/0038745 A1* | 2/2012 | Yu | G06T 15/08 348/46 |
| 2012/0274629 A1* | 11/2012 | Baek | H04N 13/271 345/419 |
| 2013/0010069 A1* | 1/2013 | Raju | H04N 19/597 348/46 |
| 2013/0027390 A1* | 1/2013 | Kim | H04N 13/0022 345/419 |
| 2013/0147686 A1* | 6/2013 | Clavin | G06F 3/013 345/8 |
| 2013/0165186 A1* | 6/2013 | Choi | H04M 1/0266 455/566 |
| 2013/0215105 A1* | 8/2013 | Yonezu | G06T 15/10 345/419 |
| 2013/0235167 A1 | 9/2013 | Izawa | |
| 2013/0235169 A1 | 9/2013 | Kato | |
| 2014/0232820 A1* | 8/2014 | Ha | H04N 13/026 348/43 |

FOREIGN PATENT DOCUMENTS

| | | |
|---|---|---|
| CN | 103202027 A | 7/2013 |
| JP | 2005073049 A | 3/2005 |
| WO | 2012060182 A1 | 5/2012 |
| WO | 2012172719 A1 | 12/2012 |

OTHER PUBLICATIONS

International Search Report for corresponding PCT Application No. PCT/JP2014/057483, 1 page, dated Jun. 17, 2014.
European Search report for corresponding EP Application No. 14834587.9, 7 pages, dated Nov. 14, 2016.

* cited by examiner

| SETTING ITEM | SET VALUE |
|---|---|
| 3D STEREOSCOPIC MODE | ON |
| KIND OF DISPLAY | HEAD-MOUNTED DISPLAY |
| 3D DEPTH | 5 |

THREE-DIMENSIONAL IMAGE GENERATING DEVICE, THREE-DIMENSIONAL IMAGE GENERATING METHOD, PROGRAM, AND INFORMATION STORAGE MEDIUM

TECHNICAL FIELD

The present invention relates to a three-dimensional image generating device, a three-dimensional image generating method, a program, and an information storage medium.

BACKGROUND ART

A technique exists that causes a display capable of displaying three-dimensional images (3D images), such as a 3D television, a head-mounted display, and a liquid crystal display provided on a 3D-compatible game device, to display three-dimensional images.

SUMMARY

Technical Problem

When the amount of disparity of a displayed three-dimensional image is larger, the displayed three-dimensional image appears to exist on the further front side or the further back side of the screen for the viewer. Therefore, the sense of reality of the displayed three-dimensional image is enhanced. On the other hand, when the amount of disparity of a displayed three-dimensional image is larger, the viewer feels more uncomfortable because of increase in the burden imposed on the eyes for example. Therefore, a limit exits to the improvement in the sense of reality of the displayed three-dimensional image so far.

It is generally known that the range of the value of the amount of disparity in which the viewer feels uncomfortable differs depending on the kind of display on which a three-dimensional image is displayed. For example, the viewer feels uncomfortable when the amount of disparity of a three-dimensional image displayed on a 3D television surpasses 3% of the horizontal width of the screen. On the other hand, in a head-mounted display, the screen used differs between the left eye and the right eye. Thus, the viewer does not feel uncomfortable even when the amount of disparity of a three-dimensional image displayed on the head-mounted display surpasses 3% of the horizontal width of the screen. Therefore, to enhance the sense of reality of a displayed three-dimensional image as much as possible without giving the viewer a feeling of discomfort, it is desirable that the amount of disparity of the three-dimensional image displayed on a display becomes the amount of disparity according to the kind of this display. However, in conventional techniques, the amount of disparity of a generated three-dimensional image is not the amount of disparity according to the kind of display on which this three-dimensional image is displayed.

The present invention is made in view of the above-described problems and one of objects thereof is to provide a three-dimensional image generating device, a three-dimensional image generating method, a program, and an information storage medium that can set the amount of disparity of a generated three-dimensional image to the amount of disparity according to the kind of display on which this three-dimensional image is displayed.

Solution to Problems

In order to solve the above-described problem, a three-dimensional image generating device according to the present invention is a three-dimensional image generating device that generates a three-dimensional image and includes an identifying section that identifies a kind of display to which the three-dimensional image is output and a three-dimensional image generating section that generates the three-dimensional image with the amount of disparity according to the kind of the display identified.

Furthermore, a three-dimensional image generating method according to the present invention is a three-dimensional image generating method for generating a three-dimensional image and includes a kind identifying step of identifying a kind of display to which the three-dimensional image is output and a three-dimensional image generating step of generating the three-dimensional image with the amount of disparity according to the kind of the display identified.

Moreover, a program according to the present invention causes a computer that generates a three-dimensional image to carry out a procedure of identifying a kind of display to which the three-dimensional image is output and a procedure of generating the three-dimensional image with the amount of disparity according to the kind of the display identified.

In addition, an information storage medium according to the present invention is a computer-readable information storage medium that stores a program causing a computer that generates a three-dimensional image to carry out a procedure of identifying a kind of display to which the three-dimensional image is output and a procedure of generating the three-dimensional image with the amount of disparity according to the kind of the display identified.

According to the present invention, the amount of disparity of a generated three-dimensional image can be set to the amount of disparity according to the kind of display on which this three-dimensional image is displayed.

In one aspect of the present invention, the three-dimensional image generating section generates the three-dimensional image with the amount of disparity in a range according to the kind of the display identified.

Furthermore, in one aspect of the present invention, the three-dimensional image generating section generates the three-dimensional image with the amount of disparity according to whether or not the display to which the three-dimensional image is output is a head-mounted display.

Moreover, in one aspect of the present invention, the three-dimensional image generating section generates the three-dimensional image with the amount of disparity according to the number of screens on which the three-dimensional image is displayed.

In addition, in one aspect of the present invention, the three-dimensional image generating section generates the three-dimensional image with the amount of disparity according to the distance between eyes of a user and a screen on which the three-dimensional image is displayed when the user sees the three-dimensional image.

Furthermore, in one aspect of the present invention, the three-dimensional image generating section generates the three-dimensional image with the amount of disparity according to whether an image for a left eye and an image for a right eye included in the three-dimensional image are displayed on the same screen or displayed on different screens.

Moreover, in one aspect of the present invention, the three-dimensional image generating section generates the 3D image with the amount of disparity according to a combination of the kind of the display to which the three-dimensional image is output and a display size.

DESCRIPTION OF EMBODIMENTS

One embodiment of the present invention will be described in detail below based on the drawings.

Figure 1:
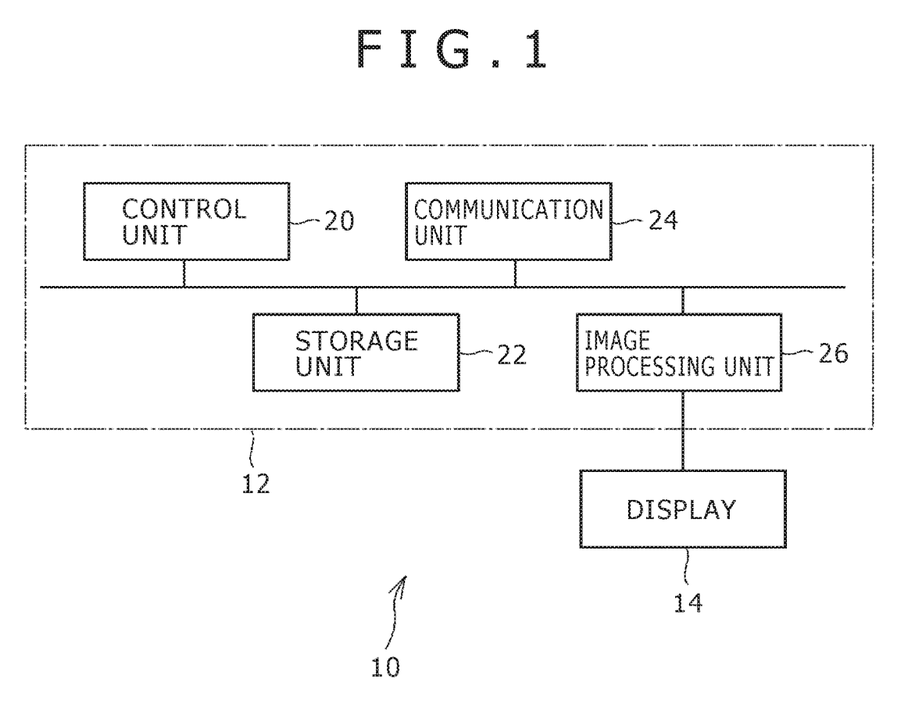
FIG. 1 is a diagram showing one example of the overall configuration of an information processing system according to one embodiment of the present invention.

FIG. 1 is a diagram showing one example of the overall configuration of an information processing system 10 according to one embodiment of the present invention. As shown in FIG. 1, the information processing system 10 according to the present embodiment includes an information processing device 12 and a display 14.

The display 14 according to the present embodiment is the display 14 capable of displaying three-dimensional images (3D images), such as a 3D-compatible head-mounted display or a 3D television.

The information processing device 12 according to the present embodiment includes a control unit 20, a storage unit 22, a communication unit 24, and an image processing unit 26 for example. The control unit 20 is a program control device such as a CPU that operates in accordance with a program installed in the information processing device 12 for example. The storage unit 22 is e.g. a storage element such as a ROM and a RAM, a hard disk drive, and so forth. In the storage unit 22, a program to be executed by the control unit 20 and so forth are stored. The communication unit 24 is e.g. a communication interface such as a network board. The image processing unit 26 is configured to include a GPU (Graphics Processing Unit) and a frame buffer for example. The GPU renders an image in the frame buffer on the basis of a graphics command and data supplied from the CPU. The image rendered in the frame buffer is converted to a video signal at a predetermined timing and is output to the display 14. In the present embodiment, the image processing unit 26 and the display 14 are connected by a cable such as an HDMI (registered trademark) (High-DefinitionMultimedia Interface) cable or a USB (Universal Serial Bus) cable.

Figure 2:
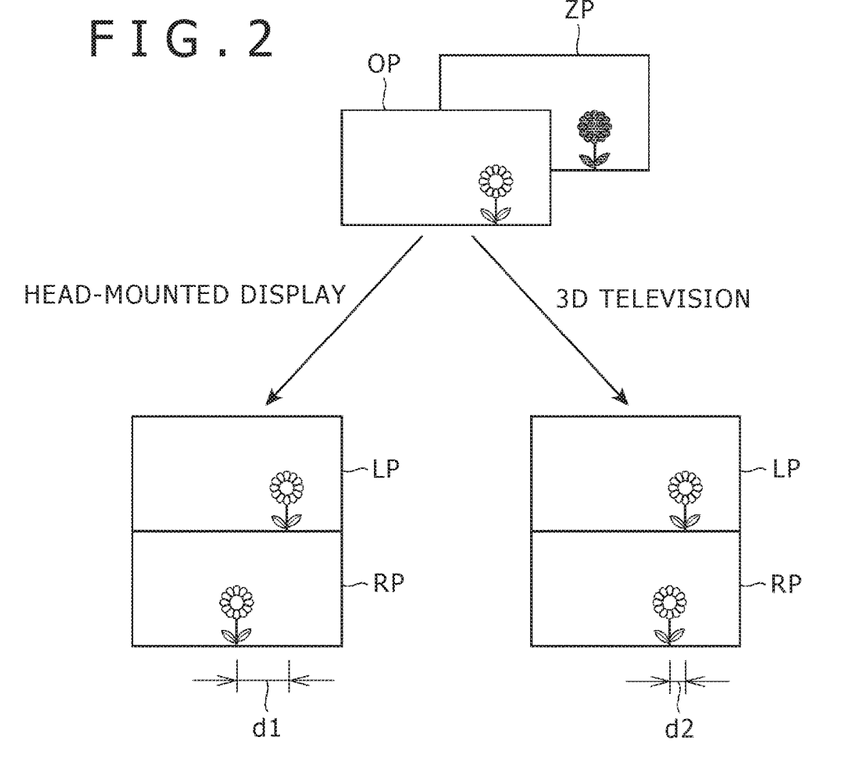
FIG. 2 is an explanatory diagram for explaining the outline of the one embodiment of the present invention.

FIG. 2 is an explanatory diagram for explaining the outline of the present embodiment. In the present embodiment, a program installed in the information processing device 12 is executed by this information processing device 12. Suppose that e.g. a game program is executed in the present embodiment. The information processing device 12 according to the present embodiment executes this game program. Thus, according to the progress status of the game, generation of a raster image that is a two-dimensional image (2D image) and decision of the value of a Z-buffer are carried out at a predetermined frame rate (e.g. every 1/60 seconds). This raster image will be referred to as an original image OP in the present embodiment. Furthermore, in the present embodiment, about each pixel included in this original image OP, the value of the Z-buffer associated with this pixel is decided.

The value of the Z-buffer is associated with a coordinate value defined by regarding the direction perpendicular to the plane forming the original image OP as the coordinate axis. Suppose that, in the present embodiment, regarding this coordinate axis, the point on the plane formed by the original image OP is regarded as the origin and the back side is defined as the positive-direction side. That is, suppose that the value of the Z-buffer is 0 at a point on the plane forming the original image OP and the value of the Z-buffer is positive at a position on the back side relative to this plane and the value of the Z-buffer is negative at a position on the front side relative to this plane. Hereinafter, the pixel whose associated value of the Z-buffer is 0 will be referred to as the reference pixel. By associating the value of the Z-buffer associated with each pixel included in the original image OP with the position of the pixel in this original image OP, the values of the Z-buffer can be expressed as an image. This image will be referred to as a Z-buffer image ZP in the present embodiment. That is, in the present embodiment, the original image OP and the Z-buffer image ZP are generated at a predetermined frame rate.

Furthermore, in the present embodiment, the information processing device 12 outputs either a two-dimensional image or a three-dimensional image associated with the original image OP generated in the above-described manner to the display 14 according to a setting. The display 14 displays the two-dimensional image or the three-dimensional image output from the information processing device 12 in this manner.

In the present embodiment, in the case of outputting a two-dimensional image to the display 14, the information processing device 12 outputs the original image OP as it is.

On the other hand, in the case of outputting a three-dimensional image to the display 14, the information processing device 12 generates the three-dimensional image on the basis of the original image OP and the Z-buffer image ZP and outputs it to the display 14. In the present embodiment, the three-dimensional image generated by the information processing device 12 includes an image LP for the left eye and an image RP for the right eye. In the present embodiment, the original image OP is used as the image LP for the left eye directly and the image generated based on the original image OP and the Z-buffer image is used as the image RP for the right eye. As above, the information processing device 12 according to the present embodiment plays a role as a three-dimensional image generating device that generates three-dimensional images.

In the present embodiment, when a three-dimensional image is output to a head-mounted display, the image LP for the left eye and the image RP for the right eye are displayed on two screens that are each associated with a respective one of them and are different from each other. Furthermore, in the present embodiment, when a three-dimensional image is output to a 3D television, the image LP for the left eye and the image RP for the right eye are alternately displayed on one screen. As above, in the present embodiment, the number of screens on which a three-dimensional image is displayed differs between the case in which the three-dimensional image is output to a head-mounted display and the case in which it is output to a 3D television. The system that can be employed when a three-dimensional image output to a 3D television is displayed on the 3D television is not limited to the frame sequential system in which the image LP for the left eye and the image RP for the right eye are alternately displayed on one screen. For example, displaying of a three-dimensional image may be implemented by a passive glasses system to display an image in which part of the image LP for the left eye and part of the image RP for the right eye different from each other in polarization properties are alternately disposed on every horizontal scanning line basis. Furthermore, for example, if the display 14 is a glasses-free 3D display, displaying of a three-dimensional image may be implemented by a parallax barrier system.

Furthermore, the distance between the eyes of a user and the screen when the user sees a three-dimensional image displayed on the display 14 is longer with the 3D television than with the head-mounted display.

Furthermore, in the present embodiment, the three-dimensional image generated in the above-described manner differs depending on the kind of the display 14 to which this three-dimensional image is output. For example, the three-dimensional image generated in the above-described manner differs depending on whether the display 14 to which this three-dimensional image is output is a head-mounted display or a 3D television. In the present embodiment, for example, the magnitude of deviation between the image LP for the left eye and the image RP for the right eye, i.e. the amount of disparity, differs between the three-dimensional image output to a head-mounted display and the three-dimensional image output to a 3D television. For example, as shown in FIG. 2, the amount d1 of disparity of the three-dimensional image output to a head-mounted display is larger than the amount d2 of disparity of the three-dimensional image output to a 3D television.

Figure 3:
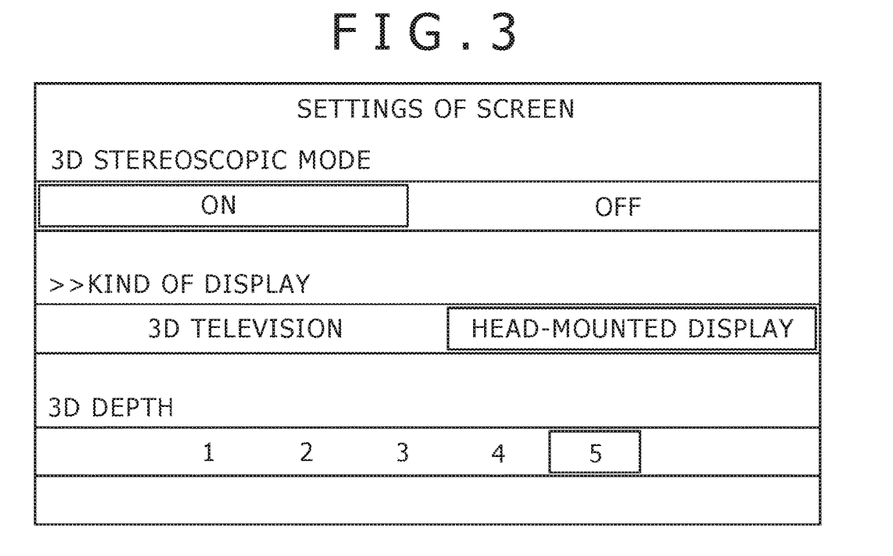
FIG. 3 is a diagram showing one example of a setting image.

In the present embodiment, settings are enabled through a setting image shown in FIG. 3 about a 3D stereoscopic mode representing whether an image output to the display 14 is a two-dimensional image or a three-dimensional image, the kind of the display 14 to which the image is output, and the 3D depth. In this setting image, settings may be enabled about other setting items such as the brightness of the screen and whether displaying of subtitles is present or absent.

When a user carries out predetermined operation in execution of the above-described game program, play of the game is interrupted and the setting image shown in FIG. 3 is displayed on the display 14. Then, when the user makes settings of various kinds of setting items through this setting image and thereafter carries out predetermined operation, the play of this game is resumed. In the present embodiment, images output to the display 14 after the resumption of the play of this game are images according to the set values of the various kinds of setting items set through the setting image.

Figure 4:
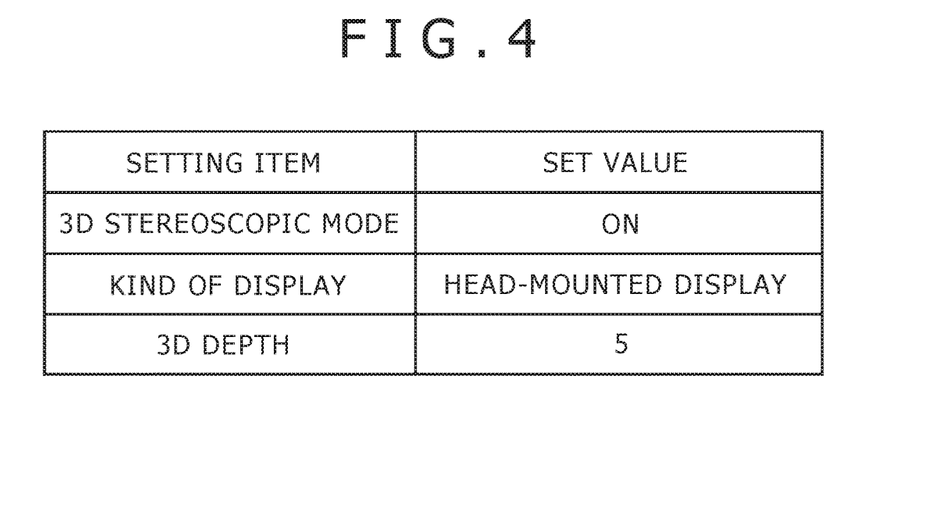
FIG. 4 is a diagram showing one example of setting data.

FIG. 4 is a diagram showing one example of pieces of setting data that are each associated with a respective one of plural setting items that can be set by this setting image and include the names of the setting items and set values about these setting items. When a user of the information processing device 12 carries out operation of changing the set value about a certain setting item through the setting image shown in FIG. 3, the setting data is updated so that the value after the change in this operation may become the set value of the setting data in which the name of this setting item is included. In FIG. 4, three pieces of setting data each associated with a respective one of the three setting items that can be set by the setting image shown in FIG. 3 are shown. Specifically, setting data in which the set value of the setting item "3D stereoscopic mode" is "ON," setting data in which the set value of the setting item "kind of display" is "head-mounted display," and setting data in which the set value of the setting item "3D depth" is "5" are shown.

In the present embodiment, a three-dimensional image is output to the display 14 if the set value of the setting item "3D stereoscopic mode" is "ON," and a two-dimensional image is output to the display 14 if this set value is "OFF."

In the present embodiment, for the user who sees a three-dimensional image displayed on the display 14, the respective pixels included in this image appear to exist on the plane formed by the screen of the display 14, on the back side relative to this plane, or on the front side relative to this plane. In the present embodiment, a pixel whose associated value of the Z-buffer is larger appears to exist on the further back side.

In the present embodiment, the length between the position at which the reference pixel is seen for the user and the plane formed by the screen of the display 14 differs depending on the set value of the setting item "kind of display." Hereinafter, this length will be referred to as the bump. For example if this set value is "3D television," the reference pixel appears to exist on the plane forming the screen of the display 14. On the other hand, for example if this set value is "head-mounted display," the reference pixel appears to exist closer to the front side than the plane forming the screen of the display 14 by a predetermined length.

Furthermore, in the present embodiment, a three-dimensional image is so generated that, about the pixel that appears to exist on the back side relative to the plane formed by the screen of the display 14, this pixel appears to exist on the further back side when the set value of the setting item "3D depth" is larger. For example, the three-dimensional image is so generated that this pixel appears to exist closer to the back side than the reference pixel by a length obtained by multiplying the associated value of the Z-buffer by the set value of the setting item "3D depth." Furthermore, the three-dimensional image is so generated that, even when this set value is the same, this pixel appears to exist on the further back side when the set value of the setting item "kind of display" is "head-mounted display" than when this set value is "3D television." For example, when this set value is "head-mounted display," the three-dimensional image is so generated that this pixel appears to exist closer to the back side than the reference pixel by a length obtained by multiplying the associated value of the Z-buffer by the set value of the setting item "3D depth" and a constant equal to or larger than 1 (e.g. 1.2).

In this manner, in the present embodiment, the three-dimensional image with the amount of disparity according to the set value of the setting item "kind of display" is generated. Specifically, for example, a three-dimensional image with a larger amount of disparity is generated when this set value is "head-mounted display" than when it is "3D television."

Furthermore, in the present embodiment, about the pixel that appears to exist on the front side relative to the plane formed by the screen of the display 14, the upper-limit value of the length between the position at which this pixel is seen and this plane is settled. Hereinafter, this upper-limit value will be referred to as the pop-up upper-limit value. For example, the pop-up upper-limit value is larger when the set value of the setting item "kind of display" is "head-mounted display" than when it is "3D television." Furthermore, in the present embodiment, the three-dimensional image is so generated that the lengths from the plane formed by the screen of the display 14 to the positions at which the respective pixels are seen are equal to or shorter than the pop-up upper-limit value. In this manner, in the present embodiment, the three-dimensional image with the amount of disparity in a range according to the kind of the display 14 to which the three-dimensional image is output is generated.

In the above-described manner, in the present embodiment, attribute values of a three-dimensional image, such as the value of the amount of disparity of the three-dimensional image and the value of the bump, can be set to attribute values according to the kind of display to which this three-dimensional image is output.

A further description will be made below mainly about processing of generating an image to be output from the information processing device 12 to the display 14.

Figure 5:
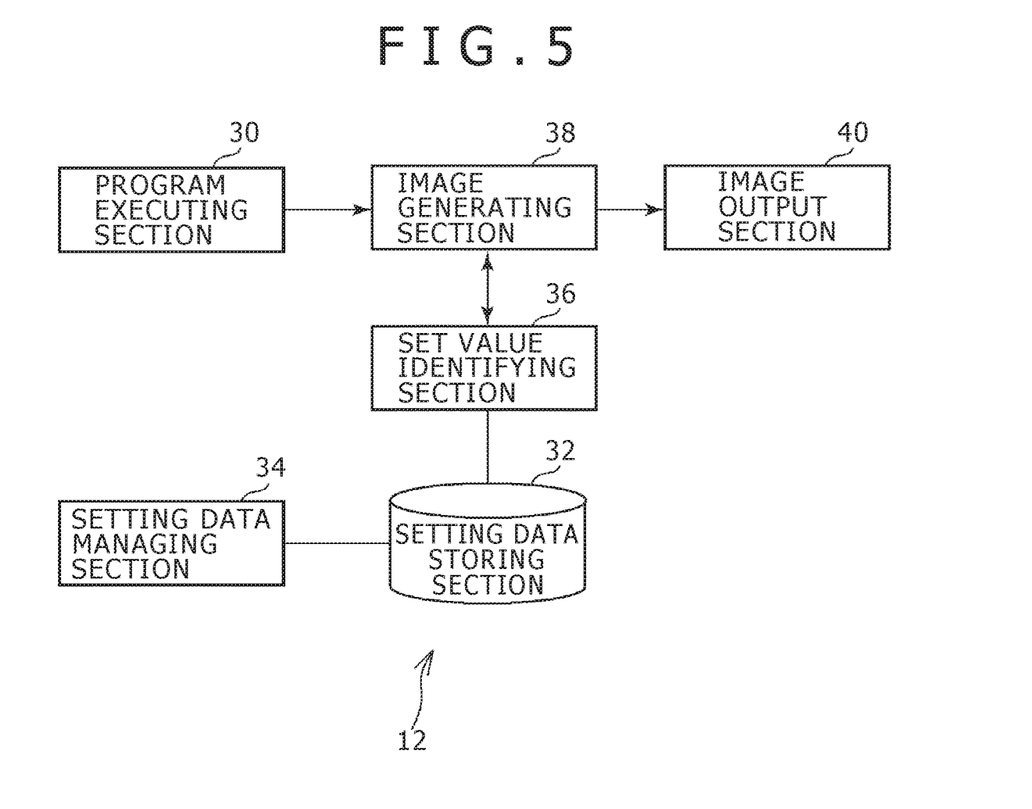
FIG. 5 is a functional block diagram showing one example of functions implemented in an information processing device according to the one embodiment of the present invention.

FIG. 5 is a functional block diagram showing one example of functions implemented in the information processing device 12 according to the present embodiment. In the information processing device 12 according to the present embodiment, all of the functions shown in FIG. 5 do not need to be implemented and a function other than the functions shown in FIG. 5 may be implemented.

Furthermore, as shown in FIG. 5, from a functional perspective, the information processing device 12 according to the present embodiment includes a program executing section 30, a setting data storing section 32, a setting data managing section 34, a set value identifying section 36, an image generating section 38, and an image output section 40 for example. The program executing section 30 and the setting data managing section 34 are implemented based mainly on the control unit 20. The set value identifying section 36, the image generating section 38, and the image output section 40 are implemented based mainly on the image processing unit 26. The setting data storing section 32 is implemented based mainly on the storage unit 22.

Furthermore, the above functions are implemented by executing a program that is installed in the information processing device 12 as a computer and includes commands corresponding to the above functions by the control unit of the information processing device 12. This program is supplied to the information processing device 12 via a computer-readable information storage medium such as an optical disc, a magnetic disc, a magnetic tape, a magneto-optical disc, or a flash memory or via a computer network such as the Internet for example.

The program executing section 30 executes the program installed in the information processing device 12. The program executing section 30 executes e.g. a game program in the present embodiment. Furthermore, the program executing section 30 supplies a graphics command and data to the image generating section 38.

The setting data storing section 32 stores the setting data exemplified in FIG. 4.

The setting data managing section 34 sets the set values of the setting data according to user's operation to the setting image exemplified in FIG. 3. For example, according to operation of changing a set value, the setting data managing section 34 changes this set value of the setting data to the value after the change.

The set value identifying section 36 identifies the set values of the setting data stored in the setting data storing section 32.

The image generating section 38 generates a two-dimensional image or a three-dimensional image according to the graphics command and the data supplied from the program executing section 30 and the set values identified by the set value identifying section 36. Furthermore, when generating a three-dimensional image, the image generating section 38 generates a three-dimensional image if the set value of the setting item "3D stereoscopic mode" in the setting data is "ON," and generates a two-dimensional image if this set value is "OFF." In addition, in generating a three-dimensional image, the image generating section 38 generates the three-dimensional image according to the original image OP, the Z-buffer image ZP, the setting item "kind of display" in the setting data, and the value of "3D depth" in the above-described manner.

The image output section 40 outputs the image generated by the image generating section 38 to the display 14. This image is displayed on the display 14.

Figure 6:
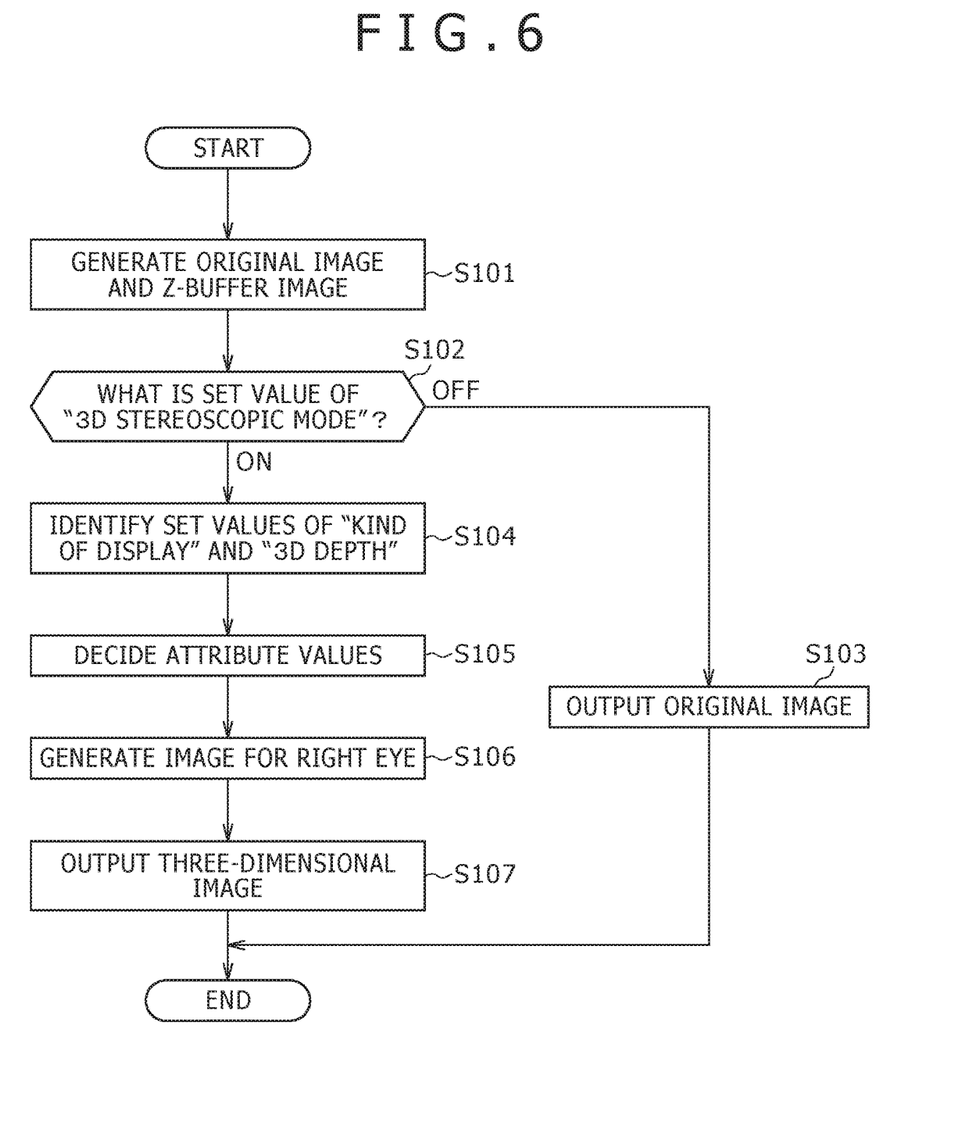
FIG. 6 is a flow diagram showing one example of the flow of processing executed in the information processing device according to the one embodiment of the present invention.

Here, one example of the flow of processing executed about each frame in the information processing device 12 according to the present embodiment will be described with reference to a flow diagram shown in FIG. 6.

First, the image generating section 38 generates the original image OP and the Z-buffer image ZP on the basis of a graphics command and data supplied from the program executing section 30 (S101). Then, the set value identifying section 36 checks the set value of the setting data that is stored in the setting data storing section 32 and has "3D stereoscopic mode" as the name of the setting item (S102). If this set value is "OFF," the image output section 40 outputs the original image OP generated by the processing shown in S101 to the display 14 (S103), and ends the processing shown in the present processing example.

If this set value is "ON," the set value identifying section 36 identifies the set value of the setting data that is stored in the setting data storing section 32 and has "kind of display" as the name of the setting item, and the set value of the setting data that is stored in the setting data storing section 32 and has "3D depth" as the name of the setting item (S104). Then, the image generating section 38 decides attribute values of a three-dimensional image, such as the amount of disparity and the bump, on the basis of the set values checked by the processing shown in S104 (S105). Then, the image generating section 38 generates the image RP for the right eye on the basis of the original image OP generated by the processing shown in S101, the Z-buffer image ZP generated by the processing shown in S101, and the attribute values decided by the processing shown in S105 (S106). Then, the image output section 40 outputs, to the display 14, the three-dimensional image including the image LP for the left eye that is the original image OP generated by the processing shown in S101 and the image RP for the right eye generated by the processing shown in S106 (S107), and ends the processing shown in the present processing example.

The present invention is not limited to the above-described embodiment.

For example, a three-dimensional image with the amount of disparity according to the combination of the kind of the display 14 to which the three-dimensional image is output and the display size may be generated. For example, even when the kind of the display 14 is the same, the amount of disparity of the three-dimensional image, in which the amount of disparity is generated, may be smaller when the display size is larger.

Furthermore, for example, the information processing device 12 may detect the kind of the connected display 14 and identify the kind of the display 14 to which a three-dimensional image is output on the basis of the result of this detection. Then, a three-dimensional image of attribute values according to the kind of the display 14 identified in this manner may be generated.

Moreover, for example, although one of the head-mounted display and the 3D television is set as the set value of the setting item "kind of display" in the above-described embodiment, another kind of the display 14 may be allowed to be set as this set value. In addition, for example, the number of screens (e.g. 1 or 2) on which a three-dimensional image is displayed may be allowed to be set as this set value. Furthermore, for example, the distance between the eyes of a user and the screen when the user sees a three-dimensional image may be allowed to be set as this set value. Specifically, for example, the distance between the eyes of a user and the screen of a head-mounted display when the user sees a three-dimensional image or the distance between the eyes of the user and the screen of a 3D television may be allowed to be set. Moreover, for example, whether the image LP for the left eye and the image RP for the right eye included in a three-dimensional image are displayed on the same screen or displayed on different screens may be allowed to be set as this set value. In addition, a combination of the factors described above may be allowed to be set as this set value. Specifically, for example, the combination of the number of screens on which a three-dimensional image is displayed and the distance between the eyes of a user and the screen when the user sees the three-dimensional image may be allowed to be set. Furthermore, for example a three-dimensional image with the amount of disparity according to the set value shown above may be allowed to be generated.

Moreover, for example, there is no need to employ the configuration in which the set value of the setting item "3D depth" gives influence only to the pixels that are set to appear to exist on the back side relative to the plane formed by the screen of the display 14. For example, a three-dimensional image may be so generated that, about the pixel that is set to appear to exist on the front side relative to the plane formed by the screen of the display 14, the pixel appears to exist on the further front side for the user when the set value of the setting item "3D depth" in the setting data is larger. Furthermore, the three-dimensional image may be so generated that, even when this set value is the same, this pixel appears to exist on the further front side when the set value of the setting item "kind of display" in the setting data is "head-mounted display" than when this set value is "3D television."

In addition, the present embodiment may be applied to not only a scene in which a three-dimensional image is generated based on a two-dimensional image but also a scene in which a three-dimensional image representing a state when an object disposed in a virtual space is seen from two cameras is generated.

Moreover, the information processing device 12 may include the display 14 as a built-in component. Furthermore, the information processing device 12 may be composed of plural casings. In addition, the above-described specific character strings and the specific character strings in the drawings are exemplification and the present invention is not limited to these character strings.

The invention claimed is:

1. A three-dimensional image generating device that generates a three-dimensional image, comprising:
    an identifying section that determines a first setting value and a second setting value, the values being selected by a user to effect a viewing, by the user, of the image according to the values; and
    a three-dimensional image generating section that generates the three-dimensional image from a left eye image and a right eye image with disparity according to the selected values; wherein
    the first setting value indicates a kind of display on which the image is to be displayed in a three-dimensional display mode, the kind being selected from the group consisting of a head-mounted dual-screen display and a three-dimensional single-screen display;
    the second setting value indicates a three-dimensional depth user comfort level of the disparity for the selected kind, ranging from a lesser level corresponding to lesser disparity for the selected kind, to a greater level corresponding to greater disparity for the selected kind; and
    the disparity between the left eye image and the right eye image is greater when the kind is the dual-screen display than when the kind is the single-screen display, regardless of the value of the second setting.

2. The three-dimensional image generating device according to claim 1, wherein the three-dimensional image generating section generates the three-dimensional image with an amount of disparity in a range, wherein a size of the range differs according to the kind of display identified.

3. The three-dimensional image generating device according to claim 1, wherein the three-dimensional image generating section generates the three-dimensional image with an amount of disparity in a range, wherein a size of the range is greater when the display to which the three-dimensional image is output is the dual-screen display.

4. The three-dimensional image generating device according to claim 1, wherein the three-dimensional image generating section generates the three-dimensional image with an amount of disparity in a range, wherein a size of the range increases as a number of screens on which the three-dimensional image is displayed increases.

5. The three-dimensional image generating device according to claim 1, wherein the three-dimensional image generating section generates the three-dimensional image with an amount of disparity in a range, wherein a size of the range increases as a distance between eyes of a user and a screen on which the three-dimensional image is displayed decreases.

6. The three-dimensional image generating device according to claim 1, wherein the three-dimensional image generating section generates the three-dimensional image with an amount of disparity in a range, wherein a size of the range increases as a number of screens shared for display by the left eye image included in the three-dimensional image and the right eye image included in the three-dimensional image decreases.

7. The three-dimensional image generating device according to claim 1, wherein the three-dimensional image generating section generates the three-dimensional image with an amount of disparity in a range, wherein a size of the range increases as a display size of the kind of display decreases.

8. A three-dimensional image generating method, comprising:
    determining a first setting value and a second setting value, the values being selected by a user to effect a viewing, by the user, of the image according to the values; and
    generating the three-dimensional image from a left eye image and a right eye image with disparity according to the selected values; wherein
    the first setting value indicates a kind of display on which the image is to be displayed in a three-dimensional display mode, the kind being selected from the group consisting of a head-mounted dual-screen display and a three-dimensional single-screen display;

the second setting value indicates a three-dimensional depth user comfort level of the disparity for the selected kind, ranging from a lesser level corresponding to lesser disparity for the selected kind, to a greater level corresponding to greater disparity for the selected kind; and the disparity between the left eye image and the right eye image is greater when the kind is the dual-screen display than when the kind is the single-screen display, regardless of the value of the second setting.

9. A non-transitory, computer readable recording medium containing a computer program, which when executed by a computer causes the computer to carry out actions, comprising:

by an identifying section, determining a first setting value and a second setting value, the values being selected by a user to effect a viewing, by the user, of the image according to the values; and by a three-dimensional image generating section, generating the three-dimensional image from a left eye image and a right eye image with disparity according to the selected values; wherein the first setting value indicates a kind of display on which the image is to be displayed in a three-dimensional display mode, the kind being selected from the group consisting of a head-mounted dual-screen display and a three-dimensional single-screen display;

the second setting value indicates a three-dimensional depth user comfort level of the disparity for the selected kind, ranging from a lesser level corresponding to lesser disparity for the selected kind, to a greater level corresponding to greater disparity for the selected kind; and the disparity between the left eye image and the right eye image is greater when the kind is the dual-screen display than when the kind is the single-screen display, regardless of the value of the second setting.

* * * * *